(12) United States Patent
Yamaguchi (10) Patent No.: US 8,199,408 B2
(45) Date of Patent: Jun. 12, 2012

(54) IMMERSION MICROSCOPE OBJECTIVE LENS

(75) Inventor: Kotaro Yamaguchi, Kamakura (JP)

(73) Assignee: Nikon Corporation, Tokyo (JP)

( * ) Notice: Subject to any disclaimer, the term of this patent is extended or adjusted under 35 U.S.C. 154(b) by 315 days.

(21) Appl. No.: 12/718,459

(22) Filed: Mar. 5, 2010

(65) Prior Publication Data

US 2011/0063735 A1    Mar. 17, 2011

Related U.S. Application Data

(63) Continuation of application No. PCT/JP2008/066527, filed on Sep. 12, 2008.

(30) Foreign Application Priority Data

Sep. 13, 2007  (JP) .................................. 2007-238136

(51) Int. Cl.
    *G02B 21/02*    (2006.01)
(52) U.S. Cl. ...................................................... 359/656
(58) Field of Classification Search .................. 359/656, 359/754

See application file for complete search history.

(56) References Cited

U.S. PATENT DOCUMENTS

| | | | |
|---|---|---|---|
| 3,530,436 A | 9/1970 | Bertele et al. | |
| 4,772,107 A | 9/1988 | Friedman | |
| 5,532,878 A | 7/1996 | Suenaga et al. | |
| 6,519,092 B2 * | 2/2003 | Yamaguchi | 359/656 |
| 7,262,922 B2 | 8/2007 | Yamaguchi | |
| 2003/0076600 A1 | 4/2003 | Watanabe | |
| 2005/0207021 A1 | 9/2005 | Yamaguchi | |

FOREIGN PATENT DOCUMENTS

| | | |
|---|---|---|
| EP | 269868 A1 | 6/1988 |
| JP | 63-135912 A | 6/1988 |
| JP | 07-230038 A | 8/1995 |
| JP | 2000-35541 A | 2/2000 |
| JP | 2002-148519 A | 5/2002 |
| JP | 2003-121750 A | 4/2003 |
| JP | 2005-266131 A | 9/2005 |

* cited by examiner

*Primary Examiner* — Joseph P Martinez (74) *Attorney, Agent, or Firm* — Morgan, Lewis & Bockius LLP (57) ABSTRACT

An immersion microscope object lens including, in order from an object: a first lens group having positive refractive power as a whole, and including a first lens component in which a meniscus lens having a concave surface facing the object and a meniscus lens having a convex surface facing an image are cemented, a second lens component constituted by a single lens having positive refractive power, and a third lens component in which a negative lens and a positive lens are cemented; a second lens group having positive refractive power as a whole, and including a lens component in which a negative lens and a positive lens are cemented; and a third lens group having negative refractive power as a whole.

8 Claims, 10 Drawing Sheets

IMMERSION MICROSCOPE OBJECTIVE LENS

This is a continuation of PCT International Application No. PCT/JP2008/066527, filed on Sep. 12, 2008, which is hereby incorporated by reference. This application also claims the benefit of Japanese Patent Application No. 2007-238136, filed in Japan on Sep. 13, 2007, which is hereby incorporated by reference.

BACKGROUND OF THE INVENTION

1. Field of the Invention

The present invention relates to an immersion microscope objective lens, and more particularly to a mid- and high-magnification ultra-apochromatic immersion microscope objective lens which is used in a near ultraviolet to a near infrared region.

2. Background of the Related Art

The following configuration may be used in a high-magnification immersion microscope objective lens: A meniscus lens having a convex surface facing an image that is cemented with a plano-convex lens having a relatively lower refractive index than the meniscus lens such that the plane of the plano-convex lens faces an object. The cemented lens is disposed closest to the object, and using the difference of the refractive indices of these two lenses, negative refractive power is applied to the cemented surface so as to decrease the Petzval sum in order to correct the curvature of field. Another known configuration is one where two concave surfaces face each other and are disposed at positions where the beam diameter is small. Accordingly, the Petzval sum is decreased by strong negative refractive power thereof, that is, a Gaussian type lens system is created. A combination of both of these configurations is a known technology to effectively decrease the curvature of field.

Known examples of the immersion microscope objective lens having such a configuration are high magnification apochromatic microscope objective lenses disclosed in Japanese Patent Application Laid-Open Nos. H7-230038, 2000-35541, and 2002-148519. In the immersion microscope objective lenses disclosed in these publications, a surface contacting the immersion liquid of a tip lens which constitutes the cemented lens (embedded lens, that is, a lens where a small diameter lens is embedded at the tip) disposed closest to an object, is a plane. The operation to remove bubbles and foreign substances in the immersion liquid is easy, and processing the lens itself is relatively easy.

If the immersion liquid is, for example, oil, the refractive index of the immersion liquid and the refractive index of the tip lens of the embedded lens contacting the immersion liquid can roughly be the same (refractive indices of the oil and glass are both about 1.5). Therefore, even if the surface of the embedded lens contacting the immersion liquid (called a first lens surface) is a plane and the incident angle of the incident light exceeds 60°, the aberrations generated on this plane are small, and a dimensional error of the first lens surface and the center thickness hardly influence the aberrations.

The refractive index of water is about 1.33, which is low compared with the lens (glass). Therefore, if the immersion liquid is water the refractive index difference from the lens generates a spherical aberration on the boundary surface. In particular, when a lens where the NA (Numerical Aperture) exceeds 1.2 and the field of view is wide is designed, the generation of a high order spherical aberration increases and correction of the subsequent lens groups becomes difficult. In fact, if the respective index difference of the immersion liquid and the lens (water and glass) is greater than 0.1, and the first lens surface is a plane of which the NA exceeds 1.2, the correction in the spherical aberration is very difficult. One way to improve this is disclosed in Japanese Patent Application Laid-Open No. 2005-266131, which increases the NA of the objective lens to be greater than 1.2 thereby making the first lens surface contacting the immersion liquid a shallow concave surface.

SUMMARY OF THE INVENTION

Recently various observation methods have been made available. However, an immersion liquid microscope objective lens for fluorescent observation that supports a wide range of excitation lights from the near ultraviolet to the near infrared is needed. The objective lenses of the above mentioned patent documents have only chromatic aberration correction ranges from the near ultraviolet to the visible light region, so the chromatic aberration correction range must be expanded to support applications that use near infrared.

With the foregoing in view, it is an object of the present invention to provide a mid- and high-magnification immersion microscope objective lens that has a wide field of view and with a high numerical aperture (NA) exceeding 1.2, but which can still correct various aberrations in a wide region of wavelengths from the near ultraviolet to the near infrared.

In one embodiment of the present invention, an immersion microscope objective lens comprises, in order from an object: a first lens group having positive refractive power as a whole, and including a first lens component in which a meniscus lens having a concave surface facing the object and a meniscus lens having a convex surface facing an image are cemented, a second lens component constituted by a single lens having positive refractive power, and a third lens component in which a negative lens and a positive lens are cemented; a second lens group having positive refractive power as a whole, and including a lens component in which a negative lens and a positive lens are cemented; and a third lens group having negative refractive power as a whole. Also, the following conditional expressions are satisfied: $1<|r1/F|<50$, $0.1<|r2/F|<1.5$, $n12-n11>0.3$, and $n3Gp>1.7$, where $n11$ denotes a refractive index at the d-line of the meniscus lens having a concave surface facing the object of the first lens component, $n12$ denotes a refractive index at the d-line of the meniscus lens having a convex surface facing the image of the first lens component, $r1$ denotes a radius of curvature of a lens surface contacting the immersion liquid of the meniscus lens having a concave surface facing the object of the first lens component, $r2$ denotes a radius of curvature of a cemented surface of the first lens component, $F$ denotes a focal length of the entire lens system, and $n3Gp$ denotes a refractive index at the d-line of the positive lens disposed closest to the image of the third lens group.

It is preferable that the second lens group comprises, in order from the object, a fourth lens component and a fifth lens component in which a negative lens and a positive lens are cemented respectively; and a sixth lens component in which three lenses of a negative meniscus lens, a biconvex lens and a biconcave lens are cemented.

It is preferable that the third lens group comprises, in order from the object, a seventh lens component in which a positive lens and a negative lens are cemented, and which has a meniscus shape having a convex surface facing the object; and an eighth lens component in which a negative lens and a positive lens are cemented, and which has a meniscus shape having a convex surface facing the image. Also, the following conditional expressions are satisfied: $v8p>41$ and $n8p>1.8$, where v8p denotes an Abbe number of the positive lens of the eighth lens component, and n8p denotes a refractive index at the d-line of the positive lens of the eighth lens component.

It is preferable that the Abbe number is 41 or more in all the lenses constituting the first lens group to the third lens group.

As described above, according to the present invention, an immersion microscope objective lens which has a 40× magnification and a wide field of view with a 1.25 numerical aperture, but can still appropriately correct various aberrations (e.g. spherical aberration, coma aberration, curvature of field, chromatic aberration) in a wide region of wavelengths (from near ultraviolet to near infrared), and has excellent image forming performance, can be implemented.

DETAILED DESCRIPTION OF THE PREFERRED EMBODIMENTS

Figure 1:
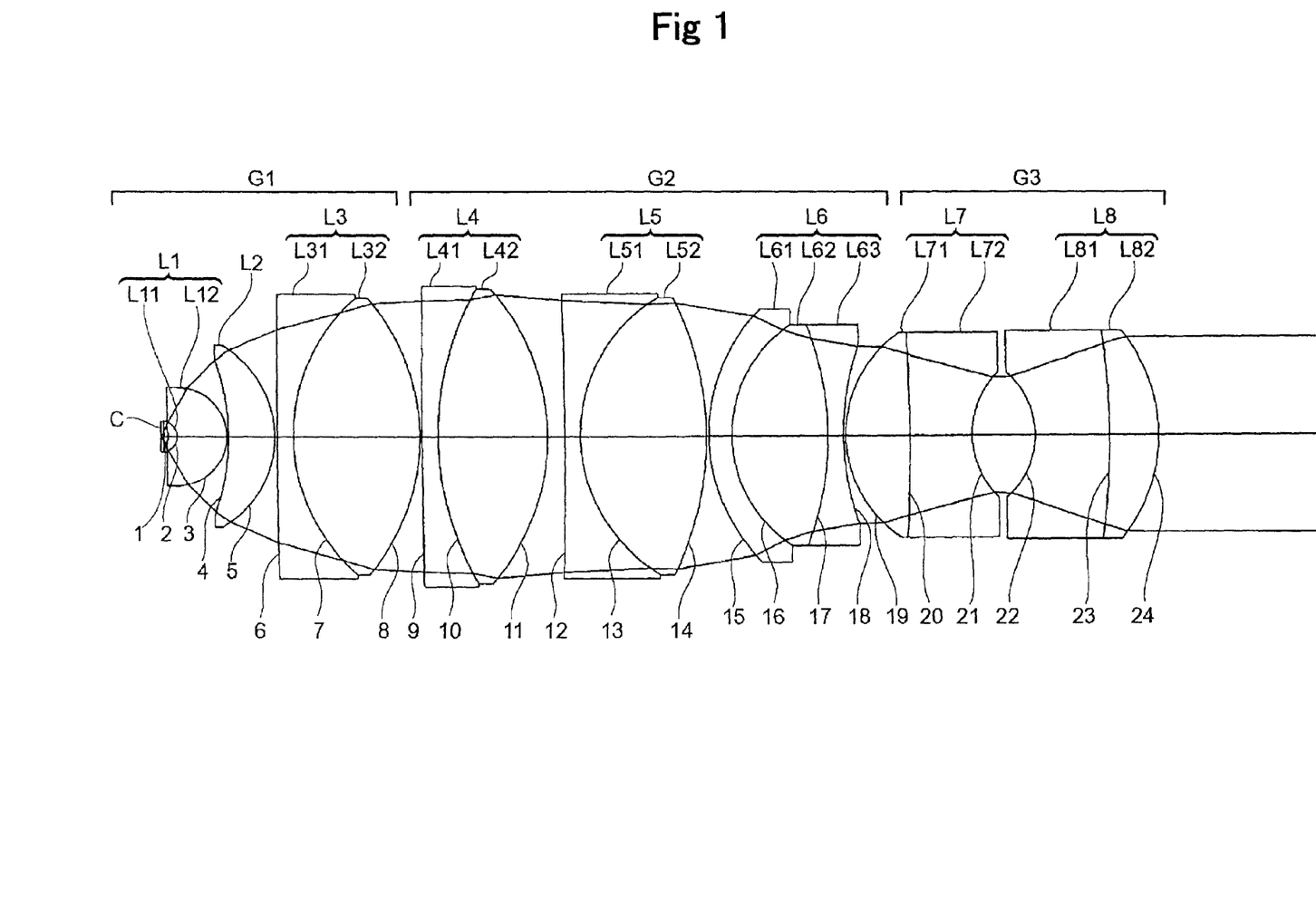
FIG. 1 is a diagram depicting a lens configuration of the immersion microscope objective lens according to a first embodiment of the present invention.
Figure 3:
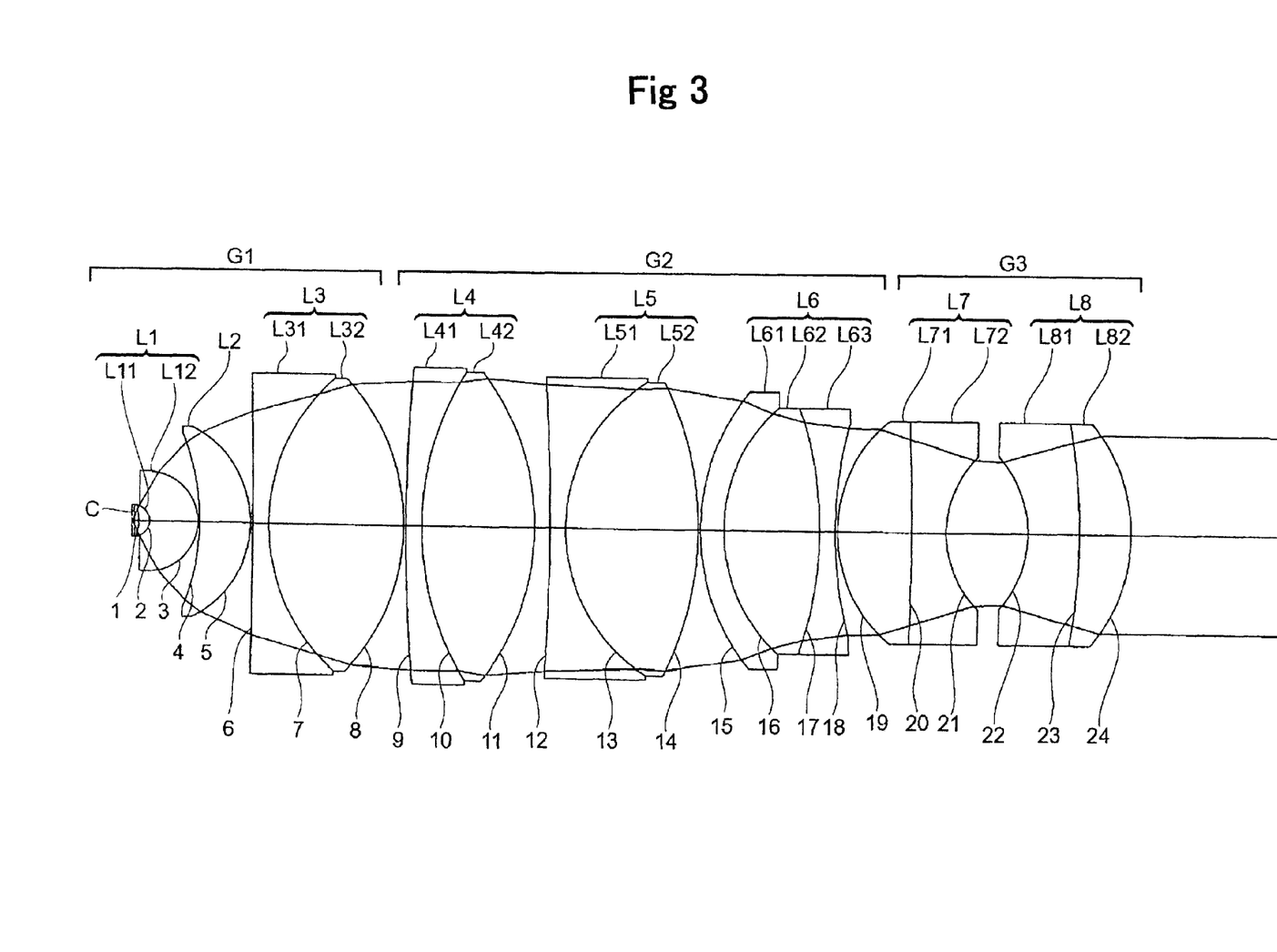
FIG. 3 is a diagram depicting a lens configuration of the immersion microscope objective lens according to a second embodiment of the present invention.

Preferred embodiments of the present invention will now be described with reference to the drawings. FIG. 1 and FIG. 3 are diagrams depicting lens configurations of immersion microscope objective lenses corresponding to a first and a second embodiment of the present invention respectively, and both of these lenses comprise, in order from an object (observation sample): a first lens group G1 having positive refractive power as a whole; a second lens group G2 having positive refractive power as a whole; and a third lens group G3 having negative refractive power as a whole.

The first lens group G1 comprises, in order from the object: a first lens component (embedded lens) L1 in which a first meniscus lens L11 having a shallow concave surface facing the object and a second meniscus lens L12 having a convex surface facing the image are cemented; a second lens component L2 constituted by a single lens having positive refractive power of which surface to the image side has higher refractive power than that to the object side; and a third lens component L3 having positive refractive power in which a negative lens L31 and a positive lens L32 are cemented.

Here the first lens component L1 is an "embedded lens", where a first meniscus lens L11 having a diameter smaller than the second meniscus lens L12 is cemented with the second meniscus lens L12 so that the convex surface to the image side of the first meniscus lens L11 is embedded in the concave surface to the object side of the second meniscus lens L12. The second lens component L2 is a single lens constituted by a positive meniscus lens having a concave surface facing the object. In the third lens component L3 the negative lens L31 is constituted by a biconcave lens or a negative meniscus lens having a convex surface facing the object, and the positive lens L32 is constituted by a biconvex lens.

The second lens group G2 comprises, in order from the object: a fourth lens component L4 having positive refractive power in which a negative lens L41 and positive lens L42 are cemented; a fifth lens component L5 having positive refractive power in which a negative lens L51 and positive lens L52 are cemented; and a sixth lens component L6 in which three lenses of a negative meniscus lens L61, a biconvex lens L62 and a biconcave lens L63 are cemented.

In the fourth lens component L4, the negative lens L41 is constituted by a negative meniscus lens having a convex surface facing the object, and the positive lens L42 is constituted by a biconvex lens. In the fifth lens component L5, the negative lens L51 is constituted by a biconcave lens, and the positive lens L52 is constituted by a biconvex lens.

The third lens group G3 comprises, in order from the object: a seventh lens component L7 in which a positive lens L71 and a negative lens L72 are cemented and which has a meniscus shape as a whole, having a convex surface facing the object; and an eighth lens component L8 in which a negative lens L81 and a positive lens L82 are cemented and which has a meniscus shape as a whole, having a convex surface facing the image.

In the seventh component L7, the positive lens L71 is constituted by a biconvex lens, and the negative lens L72 is constituted by a biconcave lens. In the eighth lens component L8, the negative lens L81 is constituted by a negative meniscus lens having a convex surface facing the image, and the positive meniscus lens L82 is constituted by a positive meniscus lens having a convex surface facing the image.

As mentioned above, the first meniscus lens L11 constituting the embedded lens L1 is a positive meniscus lens having a shallow concave surface facing the object. Therefore, even if the difference (refractive index difference) between the refractive index of the first meniscus lens L11 and the refractive index of the immersion liquid used in contact with this lens exceeds 0.1 (in other words, even if the expression |n0−n11|>0.1 is satisfied, where n0 denotes the refractive index of the immersion liquid and n11 denotes the refractive index of the first meniscus lens L11), the high order spherical aberration generated on the boundary surface between the first meniscus lens L11 and the immersion liquid can be effectively decreased. In other words, according to the immersion microscope objective lens of the present invention, the incident angle of the beam from the object is decreased by making the boundary surface between the first meniscus lens L11 and the immersion liquid a concave surface so as to suppress the generation of the high order spherical aberration. Also, strong negative refractive power is applied to the cemented surface of the first meniscus lens L11 and the second meniscus lens L12, in which the first meniscus lens L11 is embedded, therefore effectively decreasing the Petzval sum.

The beams emitted from the object transmit through the first lens component L1 and are gently deflected by the second lens component L2, which has a positive refractive power. In the second lens component L2, a surface to the image side has higher refractive power than to the object side so that deflection of marginal rays (outermost rays out of the beams emitted from the object point on the optical axis) is minimized. In the third lens component L3, the negative lens L31 and the positive lens L32 have similar refractive indices at the reference wavelength (d-line) (which have a small refractive index difference), and have different dispersions from each other. The negative lens L31 and the positive lens L32 are cemented, so that axial chromatic aberration and chromatic (wavelength difference-based) spherical aberration generated on the sharp convex surface to the image side of the first lens component L1 and the second lens component L2 can be appropriately corrected without influencing the aberrations of the reference wavelength.

The rays emitted from the object are converted into convergent rays by the first lens group G1 and the second lens group G2, which have positive refractive power. In the fourth lens component L4, the negative lens L41 and the positive lens L42 are cemented and disposed closest to the object of the second lens group G2. By the convergent rays transmitted through the fourth lens component L4, the spherical aberration and axial chromatic aberration, included in the above mentioned divergent rays, are appropriately corrected. In order to correct these aberrations (spherical aberration and axial chromatic aberration) most appropriately, it is preferable that the second lens group G2 is constituted not only by the fourth lens component L4 but also by the fifth lens component L5. In the fifth lens component L5, the negative lens L51 and the positive lens L52 are cemented. In the sixth lens component L6, three lenses of the negative meniscus lens L61, the biconvex lens L62 and the biconcave lens L63 are cemented.

The third lens group G3, which has a lens configuration having negative refractive power as a whole, can correct the axial chromatic aberration and lateral chromatic aberration with good balance and while decreasing the Petzval sum. In this case, it is preferable that the third lens group G3 has a "Gaussian type" lens configuration because this configuration enables correction of the Petzval sum more effectively.

In the immersion microscope objective lens having the above mentioned configuration, it is preferable to satisfy the following expressions (1) to (4), where n11 denotes the refractive index at the d-line of the meniscus lens L11 having the concave surface facing the object of the first lens component L1, n12 denotes a refractive index at the d-line of the meniscus lens L12 having the convex surface facing the image of the first lens component L1, r1 denotes a radius of curvature of the lens surface contacting the immersion liquid out of the meniscus lens L11 having a concave surface facing the object of the first lens component L1, r2 denotes a radius of curvature of the cemented surface of the first lens component L1, F denotes a focal length of the entire lens system, and n3Gp denotes a refractive index at the d-line of the positive lens L82 disposed closest to the image of the third lens group G3.

$$1 < |r1/F| < 50 \quad (1)$$

$$0.1 < |r2/F| < 1.5 \quad (2)$$

$$n12 - n11 > 0.3 \quad (3)$$

$$n3Gp > 1.7 \quad (4)$$

The radius of curvature of the surface contacting the immersion liquid is called the "first lens surface" and corresponds to the surface number 1 in the later mentioned Example 1 and Example 2). The conditional expression (1) specifies an appropriate range of the ratio of the radius of curvature of the surface contacting the immersion liquid of the first meniscus lens L11, which is an embedded lens, and the focal length F of the entire lens system. If the upper limit value of conditional expression (1) is exceeded (i.e., if the radius of curvature of the first meniscus lens L11 is too large), the incident angle of the beams from the object become too wide, which makes it difficult to correct the high order spherical aberration of the lenses of subsequent groups. If the lower limit value of conditional expression (1) is not reached (i.e., if the radius of curvature of the first meniscus lens L11 is too small), removing bubbles and foreign substances in the immersion liquid is difficult. And if the NA (Numerical Aperture) exceeds 1.2, it is preferable to set the lower limit value of conditional expression (1) to 2 in order to implement a further improved image forming performance; it is preferable to set the upper limit value to 9.

The conditional expression (2) specifies an appropriate range of the ratio of the radius of curvature of the cemented surface between the first meniscus lens L11 and the second meniscus lens L12 constituting the first lens component L1, and the focal length F of the entire lens system. If the upper limit value of the conditional expression (2) is exceeded, sufficient negative refractive power on the cemented surface between these lenses L11 and L12 cannot be implemented, and the Petzval sum increases, and the flatness of the imaging plane worsens. If the lower limit value of the conditional expression (2) is not reached, the radius of curvature of the cemented surface between the first meniscus lens L11 and the second meniscus lens L12 constituting the first lens component L1 becomes too small, which makes processing difficult. It is difficult to adjust the decentering of the first meniscus lens L11 and the second meniscus lens L12, especially during cementing, and performance deteriorates, including the generation of asymmetric aberration. In order to implement a further improved image forming performance while correcting the curvature of field up to field number 25, it is preferable to set the lower limit value of the conditional expression (2) to 0.13. Also it is preferable to set the upper limit value to 0.6.

The conditional expression (3) specifies an appropriate range of the refractive index difference between the first meniscus lens L11 and the second meniscus lens L12, which constitute the first lens component L1. If the lower limit value of the conditional expression (3) is not reached, the refractive index difference between these lenses becomes too small, so sufficient negative refractive power on the cemented surface between these lenses in the first lens component L1 cannot be implemented. In addition, the Petzval sum increases, and the flatness of the imaging plane worsens. In order to further improve the image forming performance while correcting the curvature of field up to the field number 25, it is preferable to set the lower limit value of the conditional expression (3) to 0.35.

The conditional expression (4) specifies an appropriate range of the refractive index of the positive lens disposed closest to the image of the third lens group G3. In the case of the later mentioned Example 1 and Example 2, positive lens L82 constitutes the third lens group G3. If the lower limit value of the conditional expression (4) is not reached, the radius of curvature of the surface at the air side (i.e., the side face contacting air) of the eighth lens component L8 decreases in order to decrease the Petzval sum, and coma aberration worsens.

It is preferable to satisfy the following expressions (5) and (6), where v8p denotes an Abbe number of the positive lens L82 of the eighth lens component L8 of the third lens group G3, and n8p denotes a refractive index at the d-line of the positive lens L82 of the eighth lens component L8.

$$v8p > 41 \quad (5)$$

$$n8p > 1.8 \quad (6)$$

The conditional expressions (5) and (6) specify an appropriate range of the Abbe number of the positive lens L82 of the eighth lens component L8, and the refractive index at the d-line of the positive lens L82 of the eighth lens component L8 when the third lens group G3 has a Gaussian type lens configuration. If the conditional expressions (5) and (6) are not satisfied, the glass material of which refractive index is greater than 1.8 drops transmittance in the near ultraviolet region and cannot implement sufficient performance in fluorescent observation.

In all the lenses constituting the first lens group G1 to the third lens group G3, it is preferable that the Abbe number is 41 or more. This is because the generation of chromatic aberration is essentially decreased by constructing each lens by glass, of which dispersion is low. If this condition is not satisfied, it is difficult to secure transmittance in the near ultraviolet region of the entire objective lens while maintaining image forming performance with decreasing bleeding due to chromatic aberration from the center to the periphery of the field of view. It is difficult to secure transmittance because the optical glass, which has an Abbe number less than 41, has low transmittance in the near ultraviolet region.

EXAMPLES

Each example according to the present invention will now be described with reference to the drawings.

Table 1 to Table 3 shown below are tables of the parameters of each lens according to embodiments of the immersion microscope objective lens of the present invention. In each table, β is a magnification, NA is a numerical aperture, D0 is a distance from the surface of the cover glass facing the objective lens to the first lens surface (surface number 1 in the tables) of the first lens group G1, and F is a focal length of the entire lens system. The surface number is a sequence of the lens surface from the object side along the light traveling direction (hereafter called "surface number"), and the surface distance is a distance from each optical plane to the next optical plane (or imaging plane) on the optical axis, and the refractive index is a value with respect to the d-line (wavelength: 587.5620 nm).

In the tables, normally "mm" is used for the unit of focal length F, radius of curvature, surface distance and other lengths. The unit of the optical system, however, is not limited to "mm", but can be other appropriate units, since an equivalent optical performance can be acquired even if the optical system is proportionally expanded or proportionally reduced. In the tables, a radius of curvature of "0.0000" indicates a plane, and the refractive index of air, "1.00000", is omitted. In the tables, values corresponding to the conditional expressions (1) to (6) (i.e., conditional expression corresponding values) are also shown.

In the following examples, water with nd (refractive power with respect to the d-line)=1.33249, and vd (Abbe number)=55.97 is used for the immersion liquid, and the cover glass C is designed based on t (thickness)=0.17, nd (refractive power with respect to the d-line)=1.52216, and vd (Abbe number)=58.80.

First Embodiment

An immersion microscope objective lens according to a first embodiment or "Example 1" of the present invention will be described with reference to FIG. 1, FIG. 2 and Table 1. The immersion microscope objective lens according to Example 1 is a water immersion apochromatic microscope objective lens which uses water for the immersion solution, and has a 40× magnification and a 1.25 numerical aperture, and comprises, in order from the object (observation sample): a first lens group G1 having positive refractive power as a whole; a second lens group G2 having positive refractive power as a whole; and a third lens group G3 having negative refractive power as a whole, as shown in FIG. 1.

The first lens group G1 comprises, in order from an object: a first lens component L1 in which a first meniscus lens L11 having a shallow concave surface facing an object and a second meniscus lens L12 having a convex surface facing an image are cemented; a second lens component L2 constituted by a single lens having positive refractive power of which surface to the image side has higher refractive power than to the object side; and a third lens component L3 having positive refractive power in which a negative lens L31 and a positive lens L32 are cemented. The second lens group G2 comprises, in order from an object: a fourth lens component L4 having positive refractive power in which a negative lens L41 and a positive lens L42 are cemented; a fifth lens component L5 having positive refractive power in which a negative lens L51 and a positive lens L52 are cemented; and a sixth lens component L6 in which three lenses of a negative meniscus lens L61, a biconvex lens L62 and a biconcave lens L63 are cemented. The third lens group G3 comprises, in order from an object: a seventh lens component L7 in which a positive lens L71 and a negative lens L72 are cemented, and which has a meniscus shape having a convex surface facing the object as a whole, and an eighth lens component L8 in which a negative lens L81 and a positive lens L82 are cemented, and which has a meniscus shape having a convex surface facing the image as a whole.

Table 1 shows a table of each parameter in Example 1. The surface numbers 1 to 24 in Table 1 correspond to the surfaces 1 to 24 in FIG. 1.

TABLE 1

[all parameters]
β = −39.9, NA = 1.25, D0 = 0.25, F = 5.012

[lens parameters]

| Surface Number | Radius of Curvature | Surface Distance | Refractive Index | Abbe Number | Lens Name |
|---|---|---|---|---|---|
| 1 | −10.75887 | 0.700 | 1.45850 | 67.8 | L11 |
| 2 | −1.03110 | 3.000 | 1.81600 | 46.6 | L12 |
| 3 | −3.15990 | 0.100 | | | |
| 4 | −14.71881 | 3.180 | 1.56907 | 71.3 | L2 |
| 5 | −6.73158 | 0.150 | | | |
| 6 | −532.23269 | 1.000 | 1.51742 | 52.4 | L31 |
| 7 | 12.42195 | 8.500 | 1.49782 | 82.5 | L32 |
| 8 | −13.53418 | 0.150 | | | |
| 9 | 111.17799 | 1.000 | 1.81600 | 46.6 | L41 |
| 10 | 18.41259 | 7.200 | 1.43425 | 95.0 | L42 |
| 11 | −15.84471 | 1.000 | | | |
| 12 | −144.29266 | 1.000 | 1.51823 | 59.0 | L51 |
| 13 | 10.83822 | 8.500 | 1.43385 | 95.3 | L52 |
| 14 | −20.48705 | 0.150 | | | |
| 15 | 13.72040 | 1.500 | 1.81600 | 46.6 | L61 |
| 16 | 10.33666 | 6.150 | 1.43425 | 95.0 | L62 |
| 17 | −23.42408 | 1.000 | 1.81600 | 46.6 | L63 |
| 18 | 25.36729 | 0.150 | | | |
| 19 | 9.00000 | 4.750 | 1.49782 | 82.5 | L71 |
| 20 | −200.00000 | 2.200 | 1.51823 | 59.0 | L72 |
| 21 | 6.58860 | 5.200 | | | |
| 22 | −7.01686 | 3.250 | 1.65160 | 58.5 | L81 |
| 23 | −40.89441 | 3.250 | 1.73800 | 32.3 | L82 |
| 24 | −10.97925 | | | | |

TABLE 1-continued

[all parameters]
β = −39.9, NA = 1.25, D0 = 0.25, F = 5.012

[Conditional expression corresponding values]

r1 = −10.75887
F = 5.012
n12 = 1.81600
r2 = −1.03110
n11 = 1.45850
n3Gp = n8p = 1.73800
ν8p = 32.3
Conditional expression (1) |r1/F| = 2.147
Conditional expression (2) |r2/F| = 0.206
Conditional expression (3) n12 − n11 = 0.358
Conditional expression (4) n3Gp = 1.73800
Conditional expression (5) ν8p = 32.3
Conditional expression (6) n8p = 1.73800

As the table of parameters in Table 1 shows, the immersion microscope objective lens according to the present example satisfies the above conditional expressions (1) to (4).

Figure 2:
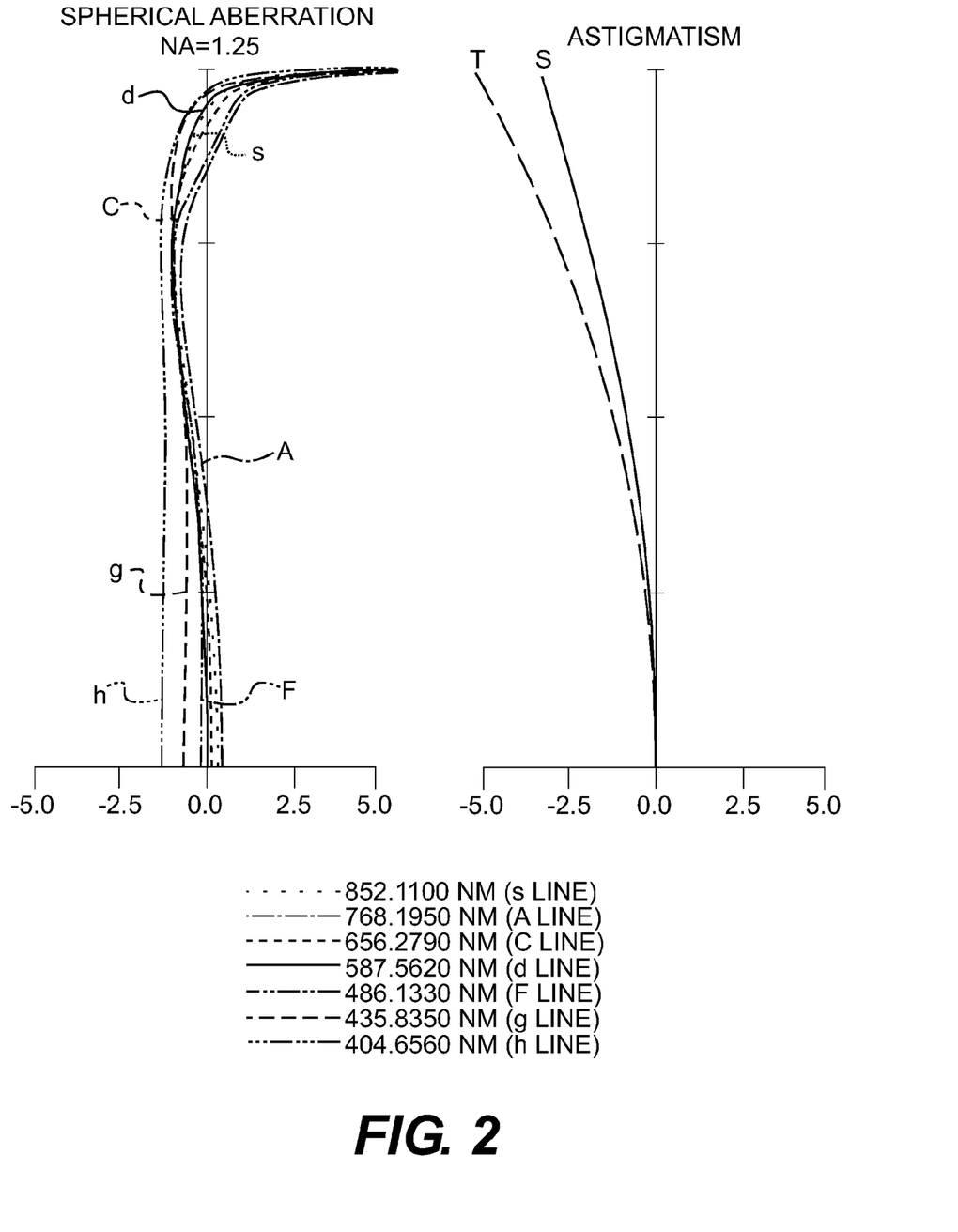
FIG. 2 are graphs showing various aberrations of the immersion microscope objective lens according to the first embodiment of the present invention.

FIG. 2 includes graphs showing various aberrations (spherical aberration, astigmatism and coma aberration) of Example 1, with respect to the s-line (wavelength: 852.1100 nm), A'-line (wavelength: 768.1950 nm), C-line (wavelength: 656.2790 nm), d-line (wavelength: 587.5620 nm), F-line (wavelength: 486.1330 nm), g-line (wavelength: 435.08350 nm) and h-line (wavelength: 404.6560 nm). In the graph showing astigmatism, the solid line indicates a sagittal imaging plane, and the broken line indicates a meridional imaging plane. In the graphs showing each aberration, NA denotes a numerical aperture and Y denotes an image height. This description shown in the graphs regarding aberrations is the same for other examples.

As seen in the graphs showing each aberration of the immersion microscope objective lens according to Example 1, the chromatic aberration is appropriately corrected to NA=1.25 and field number 22 for each wavelength area of the h-line to the s-line, including the d-line, C-line, F-line and g-line, which is the chromatic aberration correction range for a normal apochromatic lens.

Second Embodiment

A second embodiment or "Example 2" of the present invention will now be described with reference to FIG. 3, FIG. 4 and Table 2. The immersion microscope objective lens according to Example 2 is a water immersion apochromatic microscope objective lens which uses water for the immersion liquid, and has a 40× magnification and a 1.25 numerical aperture. The configuration of the immersion microscope objective lens of Example 2 is the same as Example 1, therefore each composing element is denoted with same symbol as Example 1. Accordingly, a detailed description of the composing elements is omitted (see FIG. 3). Table 2 shows a table of each parameter in Example 2. The surface numbers 1 to 24 in Table 2 correspond to the surfaces 1 to 24 in FIG. 3.

TABLE 2

[all parameters]
β = −40.1, NA = 1.25, D0 = 0.25, F = 4.988

[lens parameters]

| Surface Number | Radius of Curvature | Surface Distance | Refractive Index | Abbe Number | Lens Name |
|---|---|---|---|---|---|
| 1 | −10.00800 | 0.600 | 1.45850 | 67.8 | L11 |
| 2 | −1.03110 | 3.100 | 1.83481 | 42.7 | L12 |
| 3 | −3.15990 | 0.100 | | | |
| 4 | −15.04688 | 2.900 | 1.59240 | 68.3 | L2 |
| 5 | −6.77255 | 0.150 | | | |
| 6 | 400.00000 | 1.000 | 1.51742 | 52.4 | L31 |
| 7 | 11.51510 | 8.000 | 1.49782 | 82.5 | L32 |
| 8 | −13.44936 | 0.150 | | | |
| 9 | 569.31905 | 1.000 | 1.81600 | 46.6 | L41 |
| 10 | 18.34459 | 7.000 | 1.43385 | 95.3 | L42 |
| 11 | −13.97045 | 1.100 | | | |
| 12 | −430.45703 | 1.000 | 1.51823 | 59.0 | L51 |
| 13 | 10.06428 | 8.100 | 1.43385 | 95.3 | L52 |
| 14 | −19.51431 | 0.150 | | | |
| 15 | 11.04816 | 1.500 | 1.81600 | 46.6 | L61 |
| 16 | 8.29541 | 6.200 | 1.43425 | 95.0 | L62 |
| 17 | −19.04776 | 1.000 | 1.77250 | 49.6 | L63 |
| 18 | 16.74321 | 0.150 | | | |
| 19 | 7.78895 | 4.100 | 1.43425 | 95.0 | L71 |
| 20 | −146.46359 | 4.000 | 1.56384 | 60.7 | L72 |
| 21 | 5.61449 | 4.000 | | | |
| 22 | −5.30741 | 4.700 | 1.56384 | 60.7 | L81 |
| 23 | −52.09943 | 3.100 | 1.83481 | 42.7 | L82 |
| 24 | −10.63002 | | | | |

[Conditional expression corresponding values]

r1 = −10.00800
F = 4.988
r2 = −1.03110
n12 = 1.83481
n11 = 1.45850
n3Gp = n8p = 1.83481
ν8p = 42.7
Conditional expression (1) |r1/F| = 2.006
Conditional expression (2) |r2/F| = 0.207
Conditional expression (3) n12 − n11 = 0.376
Conditional expression (4) n3Gp = 1.83481
Conditional expression (5) ν8p = 42.7
Conditional expression (6) n8p = 1.83481

As the table of parameters in Table 2 shows, the immersion microscope objective lens according to the present example satisfies all the above conditional expressions (1) to (6).

Figure 4:
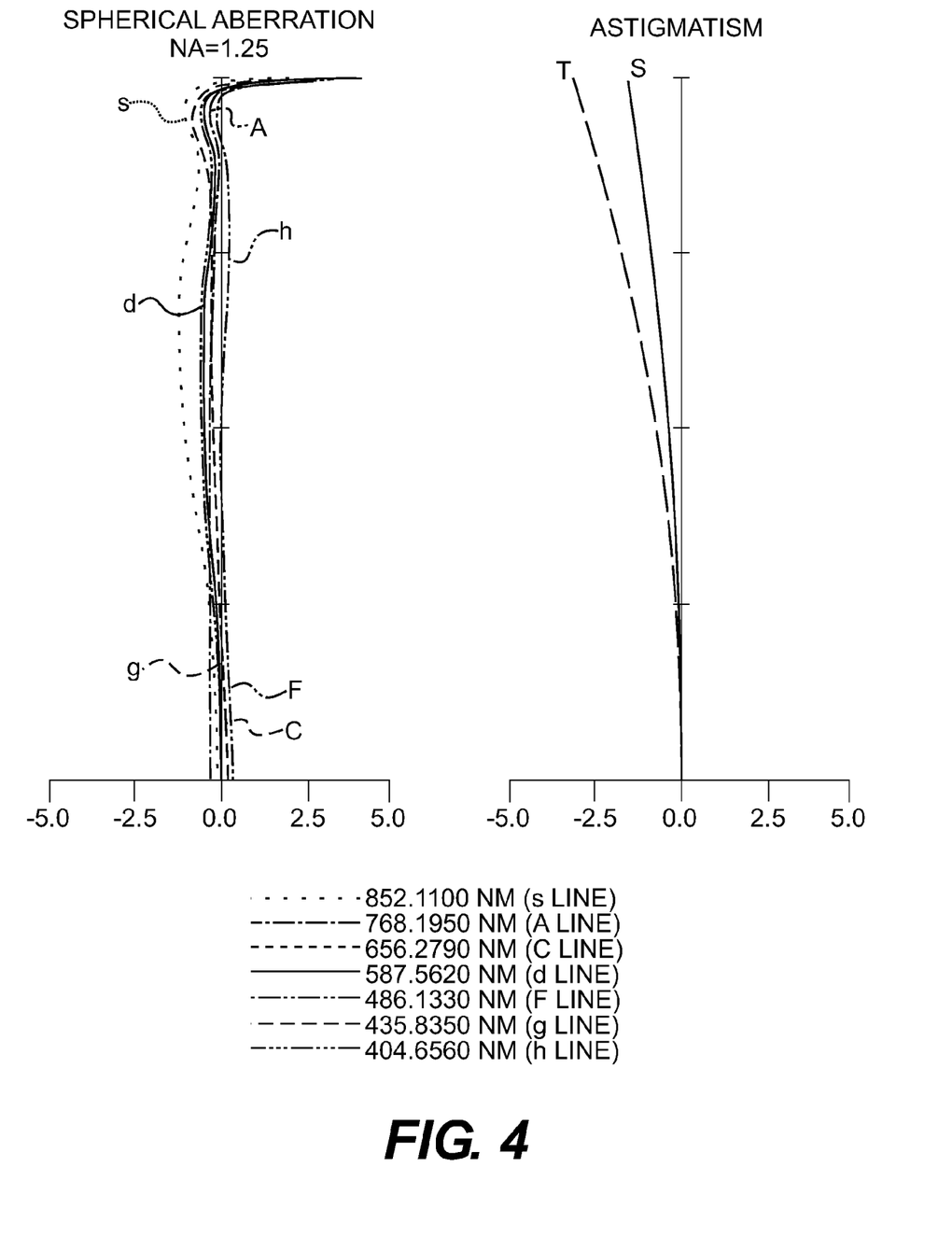
FIG. 4 are graphs showing various aberrations of the immersion microscope objective lens according to the second embodiment of the present invention.

FIG. 4 includes graphs showing various aberrations (spherical aberration, astigmatism and coma aberration) of Example 2, with respect to the s-line (wavelength: 852.1100 nm), A'-line (wavelength: 768.1950 nm), C-line (wavelength: 656.2790 nm), d-line (wavelength: 587.5620 nm), F-line (wavelength: 486.1330 nm), g-line (wavelength: 435.08350 nm) and h-line (wavelength: 404.6560 nm). As seen in the graphs showing each aberration of the immersion microscope objective lens according to Example 2, the chromatic aberration is appropriately corrected to NA=1.25 and field number 22 for each wavelength area of the h-line to the s-line, including the d-line, C-line, F-line and g-line, which is the chromatic aberration correction range for a normal apochromatic lens.

Third Embodiment

Figure 5:
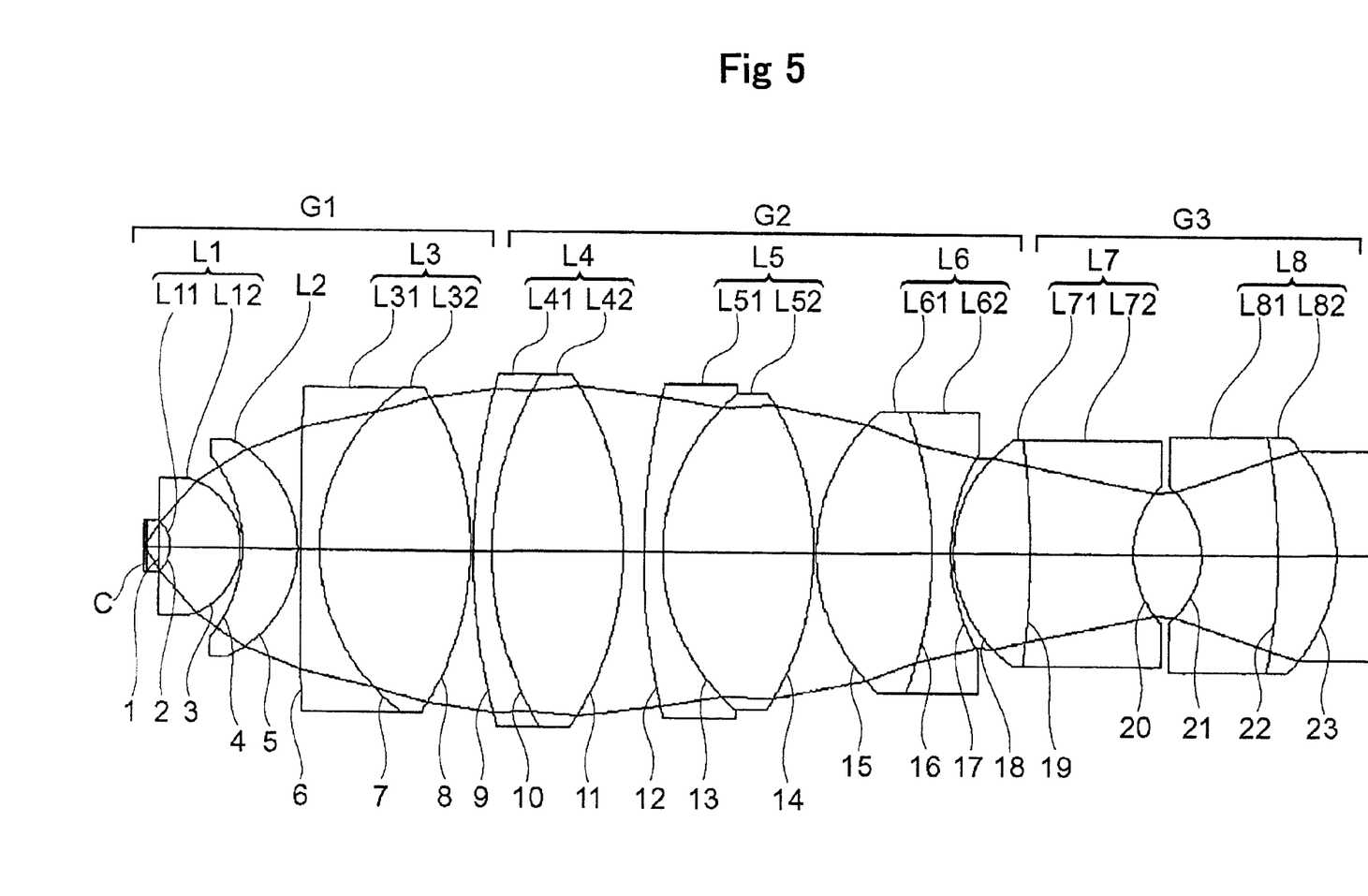
FIG. 5 is a diagram depicting a lens configuration of the immersion microscope objective lens according to a third embodiment of the present invention.

A third embodiment or "Example 3" of the present invention will now be described with reference to FIG. 5, FIG. 6 and Table 3. The immersion microscope objective lens according to Example 3 is a water immersion apochromatic microscope objective lens which uses water for the immersion liquid, and has a 40× magnification and a 1.15 numerical aperture. The configuration of the immersion microscope objective lens of Example 3 is the same as Example 1, except that the sixth lens component L6 of the second lens group G2 is constituted by two lenses, biconvex lens L61 and biconcave lens L62, which are cemented. Therefore, each composing element is denoted with the same symbol as Example 1. Accordingly, a detailed description of the composing elements is omitted (see FIG. 5). Table 3 shows a table of each parameter in Example 3. The surface numbers 1 to 23 in Table 3 correspond to the surfaces 1 to 23 in FIG. 5.

TABLE 3

[all parameters]
β = −39.9, NA = 1.15, D0 = 0.60, F = 5.013

[lens parameters]

| Surface Number | Radius of Curvature | Surface Distance | Refractive Index | Abbe Number | Lens Name |
|---|---|---|---|---|---|
| 1 | −100.00000 | 0.600 | 1.45850 | 67.8 | L11 |
| 2 | −2.00000 | 3.739 | 1.83481 | 42.7 | L12 |
| 3 | −3.94616 | 0.100 | | | |
| 4 | −8.24295 | 2.900 | 1.59240 | 68.3 | L2 |
| 5 | −6.82271 | 0.150 | | | |
| 6 | 451.83977 | 1.000 | 1.51742 | 52.4 | L31 |
| 7 | 11.51758 | 8.000 | 1.49782 | 82.5 | L32 |
| 8 | −16.91853 | 0.150 | | | |
| 9 | 37.39913 | 1.000 | 1.81600 | 46.6 | L41 |
| 10 | 20.03370 | 7.000 | 1.43385 | 95.3 | L42 |
| 11 | −18.27314 | 1.100 | | | |
| 12 | 41.25503 | 1.000 | 1.81600 | 46.6 | L51 |
| 13 | 11.70822 | 8.100 | 1.43385 | 95.3 | L52 |
| 14 | −16.52039 | 0.150 | | | |
| 15 | 10.76207 | 6.200 | 1.43385 | 95.3 | L61 |
| 16 | −22.50935 | 1.000 | 1.81600 | 46.6 | L62 |
| 17 | 10.84608 | 0.150 | | | |
| 18 | 7.68165 | 4.100 | 1.43425 | 95.0 | L71 |
| 19 | −50.00000 | 5.511 | 1.56384 | 60.7 | L72 |
| 20 | 5.56244 | 3.623 | | | |
| 21 | −4.90844 | 4.077 | 1.56384 | 60.7 | L81 |
| 22 | −36.64293 | 3.100 | 1.83481 | 42.7 | L82 |
| 23 | −9.47184 | | | | |

[Conditional expression corresponding values]

r1 = −100.00000
F = 5.013
r2 = −2.00000
n12 = 1.83481
n11 = 1.45850
n3Gp = n8p = 1.83481
ν8p = 42.7
Conditional expression (1) |r1/F| = 19.948
Conditional expression (2) |r2/F| = 0.399
Conditional expression (3) n12 − n11 = 0.376
Conditional expression (4) n3Gp = 1.83481
Conditional expression (5) ν8p = 42.7
Conditional expression (6) n8p = 1.83481

As the table of parameters in Table 3 shows, the immersion microscope objective lens according to the present example satisfies all the above conditional expressions (1) to (6).

Figure 6:
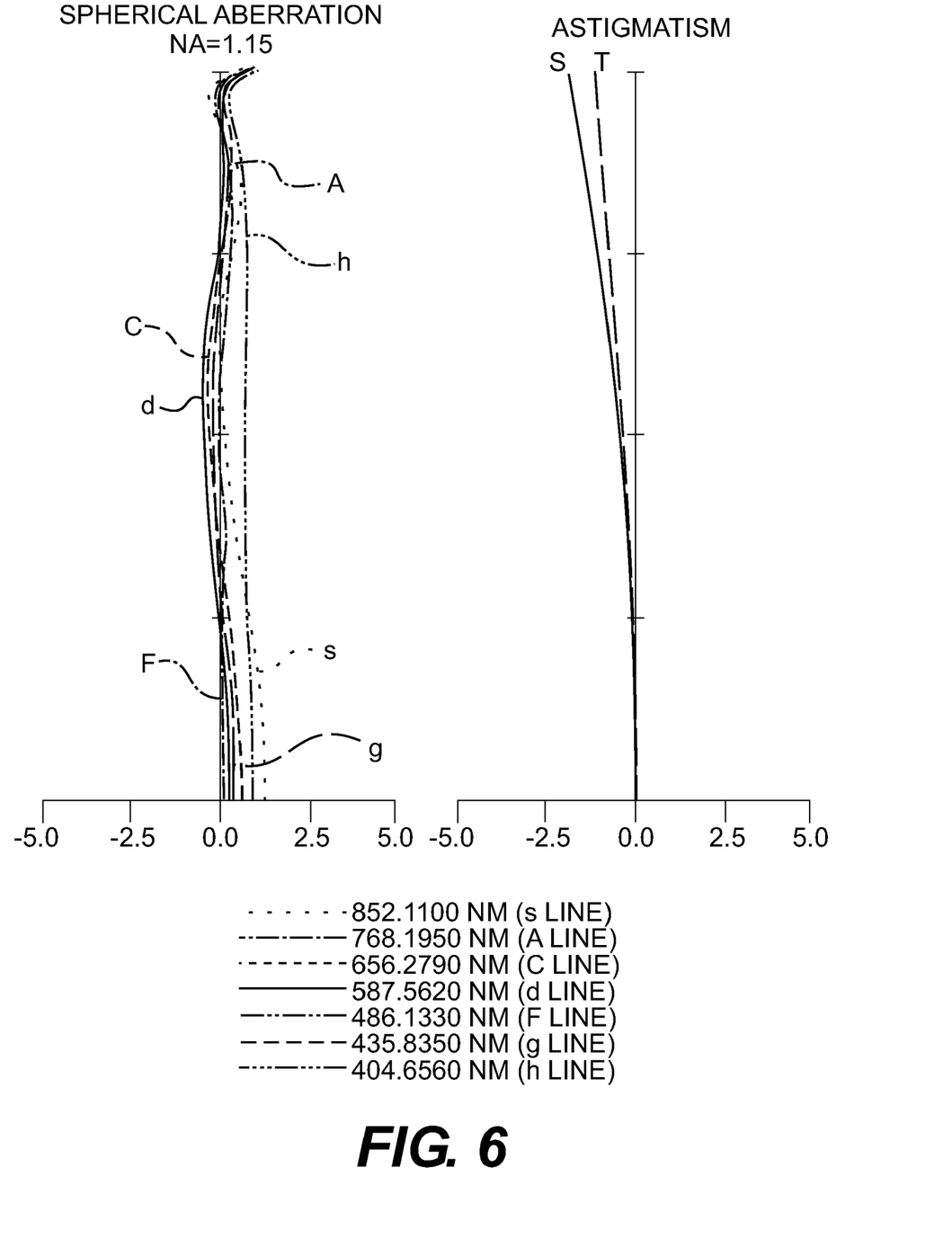
FIG. 6 are graphs showing various aberrations of the immersion microscope objective lens according to the third embodiment of the present invention.

FIG. 6 includes graphs showing various aberrations (spherical aberration, astigmatism and coma aberration) of Example 3, with respect to the s-line (wavelength: 852.1100 nm), A'-line (wavelength: 768.1950 nm), C-line (wavelength: 656.2790 nm), d-line (wavelength: 587.5620 nm), F-line (wavelength: 486.1330 nm), g-line (wavelength: 435.08350 nm) and h-line (wavelength: 404.6560 nm). As seen in the graphs showing each aberration of the immersion microscope objective lens according to Example 3, the chromatic aberration is appropriately corrected to NA=1.15 and field number 22 for each wavelength area of the h-line to the s-line, including the d-line, C-line, F-line and g-line, which is the chromatic aberration correction range for a normal apochromatic lens.

Figure 7:
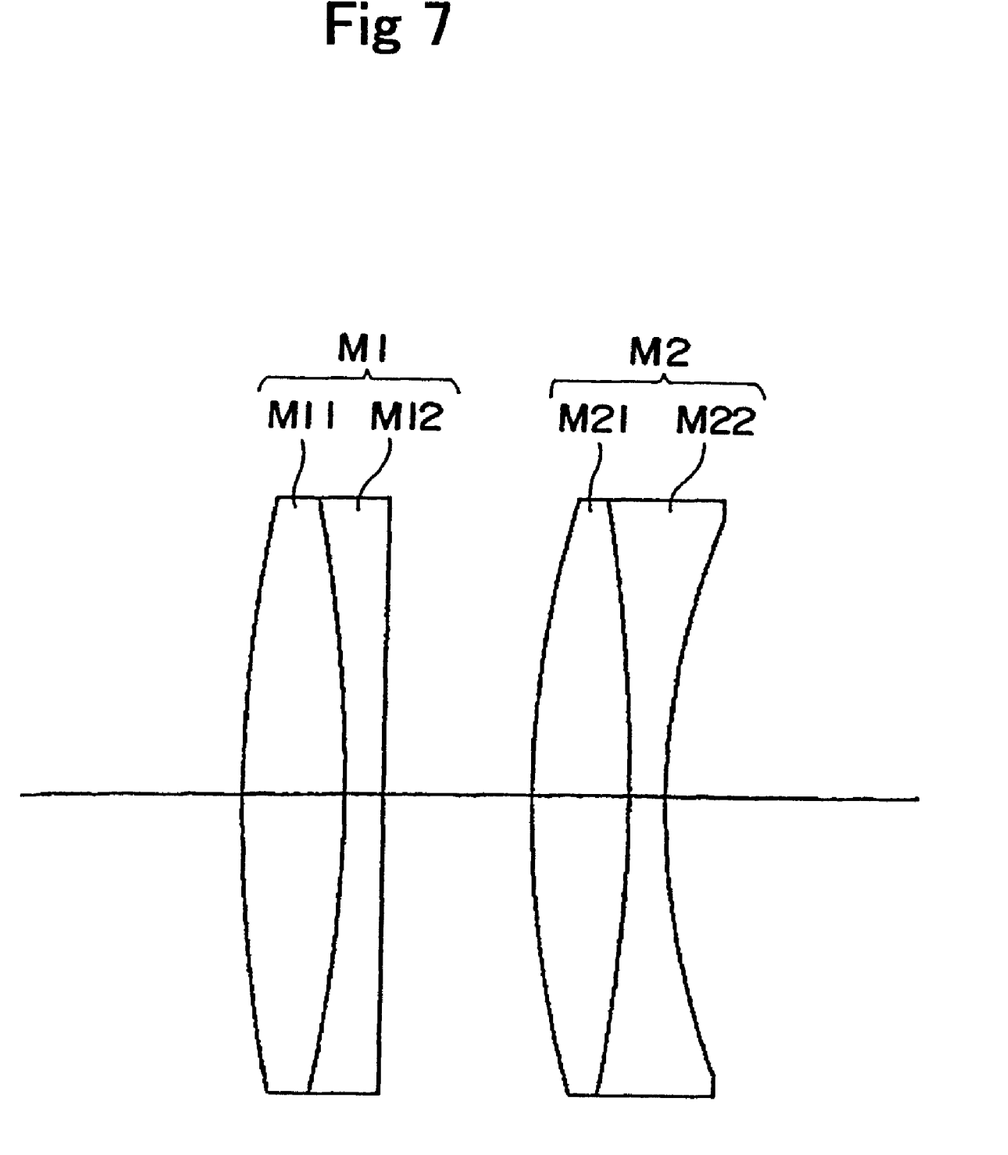
FIG. 7 is a diagram depicting a lens configuration of an image formation lens that is used in combination with the immersion microscope objective lens according to the above embodiments.

FIG. 7 is a diagram depicting a configuration of an image formation lens which is used in combination with the immersion microscope objective lens of each example, and comprises, in order from an object: a first cemented lens M1 in which a biconvex lens M11 and a biconcave lens M12 are cemented; and a second cemented lens M2 in which a biconvex lens M21 and a biconcave lens M22 are cemented. Table 4 is an example of lens data of this image formation lens. In Table 4, the surface number is a sequence of the lens surface from the object along the light traveling direction (hereafter called "surface number"), a surface distance is a distance from each optical plane to the next optical plane (or imaging plane) on the optical axis, and a refractive index is a value with respect to the d-line (wavelength: 587.5620 nm).

TABLE 4

[lens parameters]

| Surface Number | Radius of Curvature | Surface Distance | Refractive Index | Abbe Number | Lens Name |
|---|---|---|---|---|---|
| 1 | 75.040 | 5.1 | 1.62280 | 57.03 | M11 |
| 2 | −75.040 | 2.0 | 1.74950 | 35.19 | M12 |
| 3 | 1600.580 | 7.5 | | | |
| 4 | 50.260 | 5.1 | 1.66755 | 41.96 | M21 |
| 5 | −84.540 | 1.8 | 1.66755 | 44.41 | M22 |
| 6 | 36.910 | | | | |

When using the image formation lens having the parameters in Table 4, the distance to the immersion microscope objective lens of Example 1 to 3 can be 50 mm to 180 mm, whereby there are no problems in practical use. The graphs showing various aberrations in FIG. 2, FIG. 4 and FIG. 6 according to Example 1 to 3 are the results when this distance is 150 mm. These results make little difference even if this distance is in the 50 mm to 180 mm range (i.e., even at a position other than 150 mm).

As described above, according to the immersion microscope objective lens of the present invention, various aberrations (spherical aberration, astigmatism and coma aberration) can be appropriately corrected in a wide region of wavelengths (h-line to s-line) while having a 40× magnification, a wide field of view with a high numerical aperture, and excellent image forming performance.

The present invention is not limited to the above embodiments, but can be appropriately modified within a scope which does not deviate from the spirit of the present invention.

What is claimed is:

1. An immersion microscope objective lens, comprising, in order from an object: a first lens group having positive refractive power, and including a first lens component in which a meniscus lens having a concave surface facing the object and a meniscus lens having a convex surface facing an image are cemented, a second lens component being a single lens having positive refractive power, and a third lens component in which a negative lens and a positive lens are cemented;

a second lens group having positive refractive power, and including a lens component in which a negative lens and a positive lens are cemented; and a third lens group having negative refractive power, and the following conditional expressions being satisfied:

$$1 < |r1/F| < 50$$

$$0.1 < |r2/F| < 1.5$$

$$n12 - n11 > 0.3$$

$$n3Gp > 1.7$$

where n11 denotes a refractive index at the d-line of the meniscus lens having a concave surface facing the object of the first lens component, n12 denotes a refractive index at the d-line of the meniscus lens having a convex surface facing the image of the first lens component, r1 denotes a radius of curvature of a lens surface contacting the immersion liquid of the meniscus lens having a concave surface facing the object of the first lens component, r2 denotes a radius of curvature of a cemented surface of the first lens component, F denotes a focal length of the entire lens system, and n3Gp denotes a refractive index at the d-line of the positive lens disposed closest to the image of the third lens group.

2. The immersion microscope objective lens according to claim 1, wherein the third lens group comprises, in order from the object: a seventh lens component in which a positive lens and a negative lens are cemented, and which has a meniscus shape having a convex surface facing the object; and an eighth lens component in which a negative lens and a positive lens are cemented, and which has a meniscus shape having a convex surface facing the image, and
the following conditional expressions are satisfied:

$$v8p > 41$$

$$n8p > 1.8$$

where v8p denotes an Abbe number of the positive lens of the eighth lens component, and n8p denotes a refractive index at the d-line of the positive lens of the eighth lens component.

3. The immersion microscope objective lens according to claim 2, wherein the Abbe number is 41 or more in all the lenses constituting the first lens group to the third lens group.

4. The immersion microscope objective lens according to claim 1, wherein the second lens group comprises, in order from the object: a fourth lens component and a fifth lens component in which a negative lens and a positive lens are cemented respectively; and a sixth lens component in which three lenses of a negative meniscus lens, a biconvex lens and a biconcave lens are cemented.

5. The immersion microscope objective lens according to claim 4, wherein the third lens group further comprises, in order from the object: a seventh lens component in which a positive lens and a negative lens are cemented, and which has a meniscus shape having a convex surface facing the object; and an eighth lens component in which a negative lens and a positive lens are cemented, and which has a meniscus shape having a convex surface facing the image, and
the following conditional expressions are satisfied:

$$v8p > 41$$

$$n8p > 1.8$$

where v8p denotes an Abbe number of the positive lens of the eighth lens component, and n8p denotes a refractive index at the d-line of the positive lens of the eighth lens component.

6. The immersion microscope objective lens according to claim 5, wherein the Abbe number is 41 or more in all the lenses constituting the first lens group to the third lens group.

7. An immersion microscope objective lens, comprising, in order from an object: a first lens group having positive refractive power, and including a first lens component in which a meniscus lens having a concave surface facing the object and a meniscus lens having a convex surface facing an image are cemented, and which is disposed closest to the object;
a second lens group having positive refractive power, and including a lens component in which a negative lens and a positive lens are cemented; and
a third lens group having negative refractive power, and
an Abbe number of the positive lens disposed closest to the image of the third lens group being greater than 41 and a refractive index at the d-line of the positive lens being greater than 1.8.

8. The immersion microscope objective lens according to claim 7, wherein the Abbe number is 41 or more in all the lenses constituting the first lens group to the third lens group.

* * * * *